Jan. 23, 1962 J. A. JETT 3,017,744
PROPELLANT GRAIN AND ROCKET MOTOR
Filed July 11, 1957 3 Sheets-Sheet 1
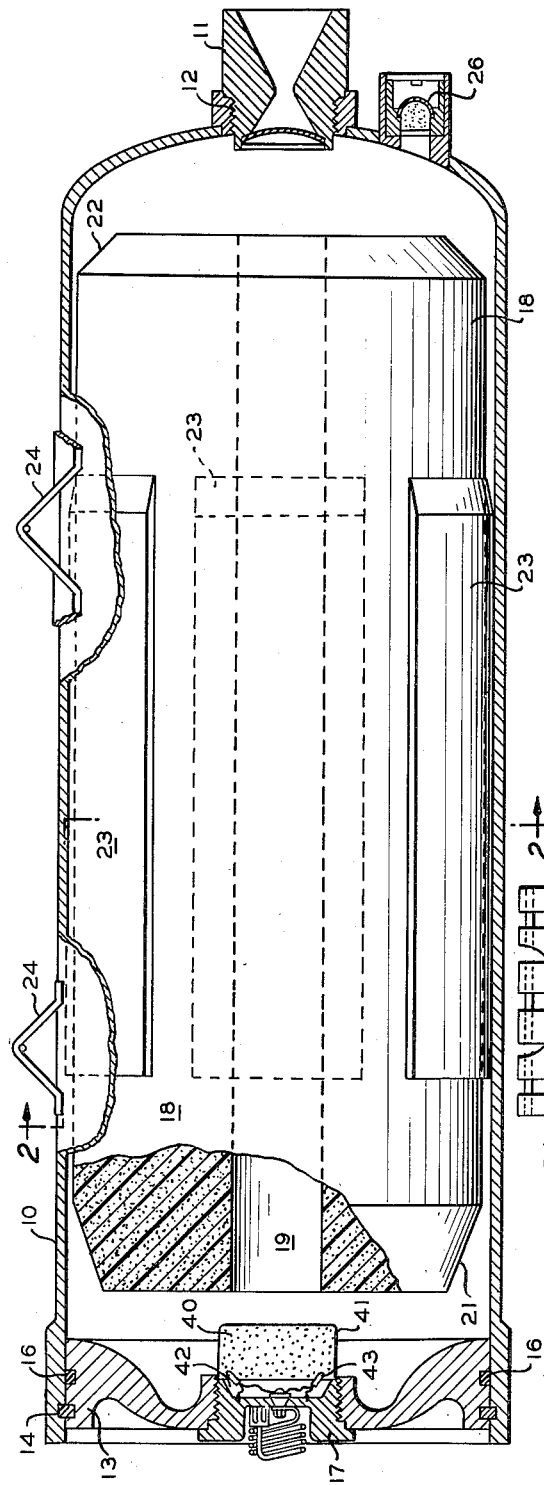
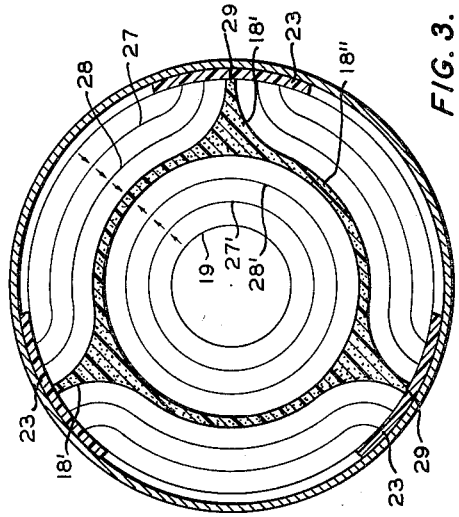
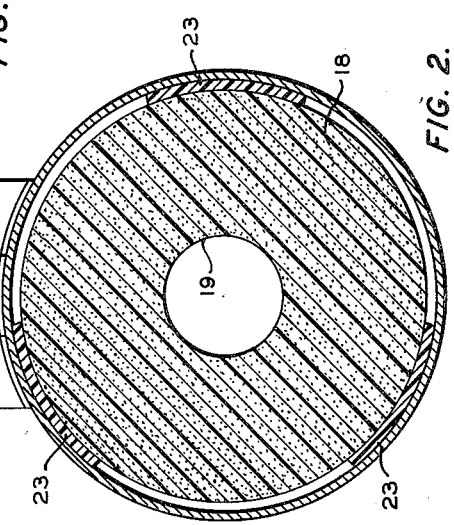
INVENTOR.
J. A. JETT
BY Hudson and Young
ATTORNEYS Jan. 23, 1962 J. A. JETT 3,017,744
PROPELLANT GRAIN AND ROCKET MOTOR
Filed July 11, 1957 3 Sheets-Sheet 2

INVENTOR.
J. A. JETT
BY *Hudson and Young*
ATTORNEYS

Jan. 23, 1962 J. A. JETT 3,017,744
PROPELLANT GRAIN AND ROCKET MOTOR
Filed July 11, 1957 3 Sheets-Sheet 3

INVENTOR.
J. A. JETT
BY
ATTORNEYS

United States Patent Office 3,017,744
Patented Jan. 23, 1962

3,017,744
PROPELLANT GRAIN AND ROCKET MOTOR
James A. Jett, McGregor, Tex., assignor, by mesne assignments, to the United States of America as represented by the Secretary of the Air Force
Filed July 11, 1957, Ser. No. 671,364
4 Claims. (Cl. 60—35.6)

This invention relates to solid propellant grains and rocket motors. In one aspect this invention relates to an improved internal-external burning solid propellant grain. In another aspect this invention relates to an improved rocket motor utilizing said improved internal-external burning solid propellant grain.

In early JATO (jet assist take off) units the propellant charge usually comprised a potted or case bonded, cigarette-burning, grain which required a high-burning rate propellant. These earlier propellants were characterized by costly and difficult processing, smoky exhaust gases, and unpredictable performance resulting from increased burning surface due to undesirable cracks and fissures developed in the grain during handling.

Superior solid propellant compositions comprising a rubbery binder, an oxidizer, and a burning-rate catalyst were recently developed. These propellants replaced the potted propellants, but were also of the cigarette-burning type and therefore required a high-burning rate. Since these propellants were not case bonded, they were more reliable, but they still entailed the other disadvantages mentioned above. Later, slower burning propellants were developed which have high mechanical strength and dependable slow burning rates making possible utilization of internal-external burning surface grains so that simultaneous ignition of these surfaces produces practically flat pressure-versus-time curves and results in superior performance in JATO units. Simultaneous and positive ignition of the external and internal surfaces has not always been obtained, and as a result reliable firing has been elusive. It is presently believed that ignition of the interior surface alone does not provide enough burning surface to generate sufficient pressure to maintain combustion and as a result the rocket fails to fire unless the exterior surface is also properly ignited.

In rocket motors of the prior art it has been customary to restrict the ends of the solid propellant grain utilized therein by bonding metal end plates to said ends. The principal means of supporting the propellant grains in said rocket motors has been feet or legs extending from said end plates and adapted to contact the case of the rocket motor. In some rocket motors the forward end only of the propellant grain has been chamfered to improve the ignition and burning characteristics of the propellant grain.

I have now found that decreasing the angle of chamfer on the forward end of the propellant grain further facilitates simultaneous ignition of the internal and external burning surfaces of said grain. Decreasing the angle of chamfer results in decreasing the size of the opening from the ignition zone at the forward end of said grain and thus causes particles of igniter material and/or hot gases from the burning of said igniter material to be more positively directed into the perforation of the grain. Decreasing the angle of chamfer, and thereby decreasing the size of the opening to the annular space between the side of the grain and the motor case, also provides a more direct passage for entry of particles of igniter material to said annular space, and consequently said particles have less tendency to bounce out of said opening. I have also found that forming a chamfer on the after end of the propellant grain improves the firing characteristics of said grain by facilitating passage of hot combustion gases from said annular space into the region adjacent the after end of said grain. This causes improved ignition of said after end of the grain. Chamfering of the after end of the grain provides space for expansion of the combustion gases from said annular space and eliminates direct impingement of said gases upon the after end of the motor case, thus eliminating the need for insulation of the inner wall of the after end of said motor case.

Another feature of the invention is that the propellant grain is supported within the motor case solely by means of pads of resilient material bonded to said grain and to said motor case. In this manner I have found it possible to completely eliminate the end plates of the prior art.

Thus, broadly speaking, the invention comprises an improved internal-external burning solid propellant grain having both ends chamfered at the external edge; and a rocket motor wherein said improved grain is mounted and supported within the case of said motor solely by means of resilient bonding pads.

An object of this invention is to provide an internal-external burning propellant grain having improved ignition characteristics. Another object of this invention is to provide means for facilitating the simultaneous ignition of the internal surface and the external surface of an internal-external burning propellant grain having improved firing characteristics. Still another object of this invention is to provide an improved rocket motor wherein the propellant grain is supported therein solely by means of resilient bonding pads. Other aspects, objects and advantages of the invention will be apparent to those skilled in the art in view of this disclosure.

Thus, according to the invention, there is provided an improved internal-external burning grain of solid propellant material having a chamfer on the external edge thereof at both ends of said grain.

Further according to the invention, there is provided a rocket motor comprising, a case having one end closed and an exhaust nozzle positioned in the other end, an igniter extending into said case, an internal-external burning grain of solid propellant positioned in said case, and a plurality of resilient bonding pads bonding said grain to said case, each of said pads having a width at least equal to one web thickness of said grain, and a length at least equal to one web thickness of said grain.

FIGURE 1 is an illustration, partly in cross section, of an improved rocket motor in accordance with the invention.

FIGURE 2 is a cross section along the lines 2—2 of FIGURE 1.

FIGURE 3 is a diagrammatic illustration of the progressive burning which occurs when the improved propellant grain of the invention, mounted in a rocket motor in accordance with the invention, is fired.

Figure 6:
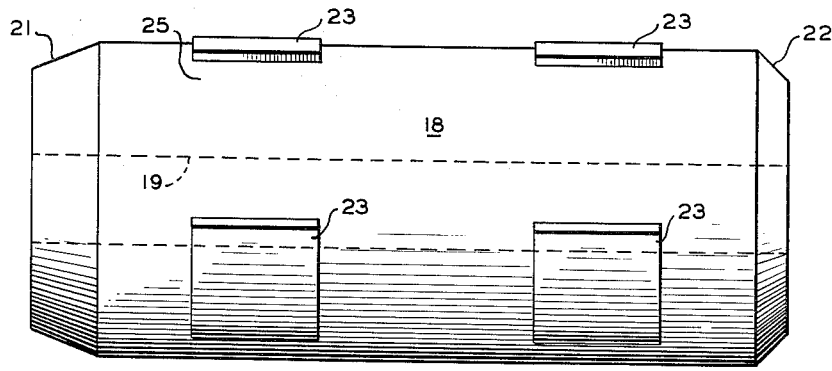
Figures 7, 8:
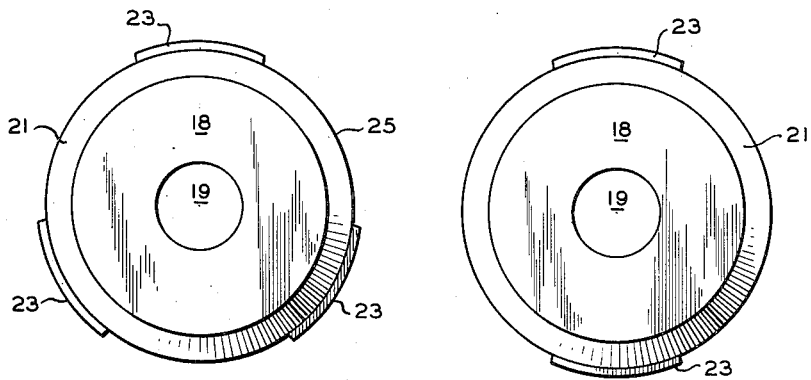

FIGURES 6, 7, and 8 illustrate modifications of the bonding pads for bonding the propellant grain to the case of the rocket motor.

It is to be noted that both ends of the propellant grain have a chamfer formed thereon at the external edge. The chamfer at the forward end of the grain can be within the range of 5 to about 29 degrees with respect to the longitudinal outer wall of the grain, more preferably within the range of 5 to 25 degrees, still more preferably within the range 15 to 25 degrees. A chamfer of about 20 degrees is presently most preferred. When employing a chamfer within the said ranges the area of the forward end of the grain is from about 0.6 to about 0.8 the cross sectional area of said grain. The chamfer at the after end of the grain, i.e., the end of the grain adjacent the exhaust nozzle, is within the range of about 30 to about 60 degrees and the area of said after end is from about 0.7 to 0.9 the cross sectional area of said grain.

It is also to be noted that the propellant grain is supported in the rocket motor case solely by means of bonding pads of resilient material. In the practice of the invention a plurality of said bonding pads are employed. In the most commonly employed grain configuration, i.e., a cylindrical grain having a cylindrical perforation, it is presently preferred to employ three bonding pads equally spaced at intervals of 120 degrees, with respect to their center lines, around the periphery of the grain. However, more than three bonding pads can be employed. The invention is not to be limited to cylindrical grains; for example, hexagonal or other polysided grains can be employed. As is well known to those skilled in the art symmetry is important in the fabrication of such grains, particularly where the rocket is to be employed as an independent source of power, and therefore symmetrical arrangements of the bonding pads on the periphery of the grains should be employed. However, the invention is not to be limited to symmetrical arrangements of such bonding pads because in rocket motor applications such as JATO units wherein the rocket motor is fastened to an airplane, symmetry is not as important as when the rocket motor is employed as an independent source of power. Said bonding pads can be placed either longitudinally or circumferentially with respect to the propellant grain. When placed longitudinally said pads are spaced equally around the periphery of the grain as discussed above, are preferably placed with their longitudinal mid-points at about the longitudinal middle point of the grain, and are of sufficient length to prevent "wobble" of the grain so as to prevent the ends of the grain from striking the wall of the motor case. When said bonding pads are placed circumferentially similar conditions are observed for the location of the pads with respect to the length of the grain. As will be understood by those skilled in the art, the specific location and arrangement of said bonding pads will depend upon the particular grain design employed, and is a matter which can be determined in accordance with each specific grain design.

Chamfering both ends of the grain and elimination of the end plates results in an increased burning surface on the propellant grain. This would result in a change in the thrust-versus-time program when the grain is fired unless the increased burning surface is compensated for in the size of the bonding pads. For comparison with propellant grains of the prior art, in fabricating propellant grains according to the invention the introduction of additional burning surface brought about by chamfering both ends and removal of the restricting end plates is compensated for by limting the area which is covered by the bonding pads so that the burning surface introduced or removed, when referred to a standard internal-external burning grain of the prior art, is not more than plus or minus 10 percent of said standard burning surface. Standard burning surface is defined as the burning surface necessary to give a flat thrust-versus-time program. In this maner it is possible to fabricate the improved propellant grains according to the invention from propellant materials of known characteristics, e.g., burning rate, which will meet established specifications. However, in no case will the length or the width of said bonding pads be less than one web thickness of the propellant grain.

Thus, the only limitation on the size of the bonding pads employed in the practice of the invention is that the width and the length of said pads are each at least equal to one web thickness of the grain as discussed further hereinafter. As used herein and in the claims, web thickness is defined as the normal distance from the surface of the perforation to the outer surface of the grain, i.e., the distance across the grain through which burning takes place.

Referring now to the drawings the invention will be more fully explained. In FIGURE 1 there is illustrated a rocket motor which comprises a case 10 having an exhaust nozzle 11 axially positioned in one end thereof. Said nozzle is preferably threaded into said case by means of threads 12. The other end of the rocket case is closed by means of closure member 13, said closure member being held in place by means of key 14 mounted in grooves provided in said closure member 13 and the internal wall of said case 10. O-ring 16 provides a seal between said closure member and the inner wall of said case. An igniter assembly 17 is screwed into said closure member. A grain of propellant material 18 is disposed within said case. Said grain is an internal-external burning grain having an axially disposed perforation 19 extending therethrough. Said grain is provided with a chamfer 21 on the external edge at the forward end thereof, and a chamfer 22 at the external edge on the after end thereof. Bonding pads 23 are employed to support said grain in said case. As shown in FIGURE 2 three of said bonding pads are employed in this embodiment of the invention. Lugs 24 are provided for supporting the rocket from an airplane. A safety diaphragm 26 is provided in the after end of said case adjacent said nozzle.

FIGURE 3 is a diagrammatic illustration of the progressive burning which occurs in a rocket motor such as that illustrated in FIGURE 1 when employing the grain supporting means of the invention. In an internal-external burning propellant grain, burning occurs progressively outward from the surface of the internal perforation and progressively inward from the outer surface of the grain. In FIGURE 3, lines 27, 27', 28 and 28', represent progressive burning surfaces developed during burning of the propellant. As indicated, burning will occur underneath the pads 23 and will result in three substantially triangular shaped splinters 18' of the propellant grain 18. Just prior to substantially complete burn-out, said splinters 18' will be connected by a thin shell 18" of said propellant material 18, and each of said splinters will be in contact with case 10 at the points 29. The width or supporting area of the points 29 just prior to burnout of shell 18" is dependent upon the width of bonding pads 23. If said bonding pads each have a width exactly equal to the web thickness of the propellant grain, burning underneath the pad 23 will reduce the point 29 to such an extent that at the time shell 18" burns through the point 29 will also burn through. However, in most instances it is usually preferred that the width of pad 23 by slightly greater than one web thickness so as to provide a somewhat more stable support for the grain throughout its burning period. It is believed clear from the illustration shown in FIGURE 3 that when bonding pads 23 have a width at least equal to one web thickness of the propellant grain that said grain will be adequately supported within the case throughout its entire burning period.

Figure 4:
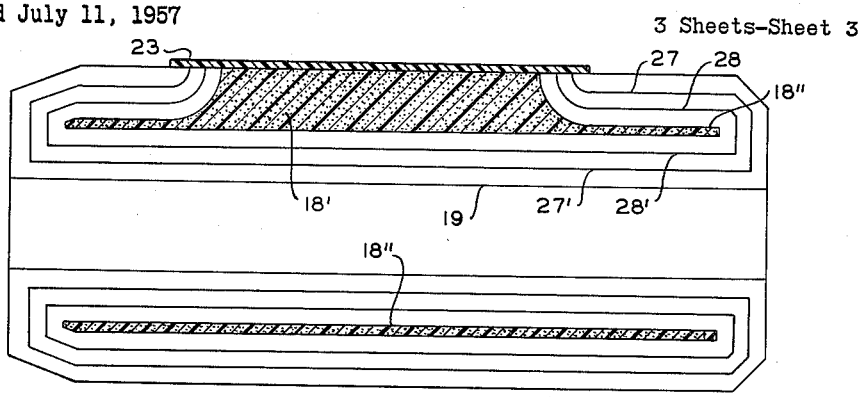
FIGURE 4 is another illustration of the progressive burning which occurs when the improved propellant grain of the invention, mounted in a rocket motor in accordance with the invention, is fired.

FIGURE 4 is another diagrammatic illustration of the progressive burning which occurs when employing the supporting means of the invention. Said FIGURE 4 is a longitudinal cross section of grain 18 and shows the configuration of the splinters from a longitudinal view.

Figure 5:
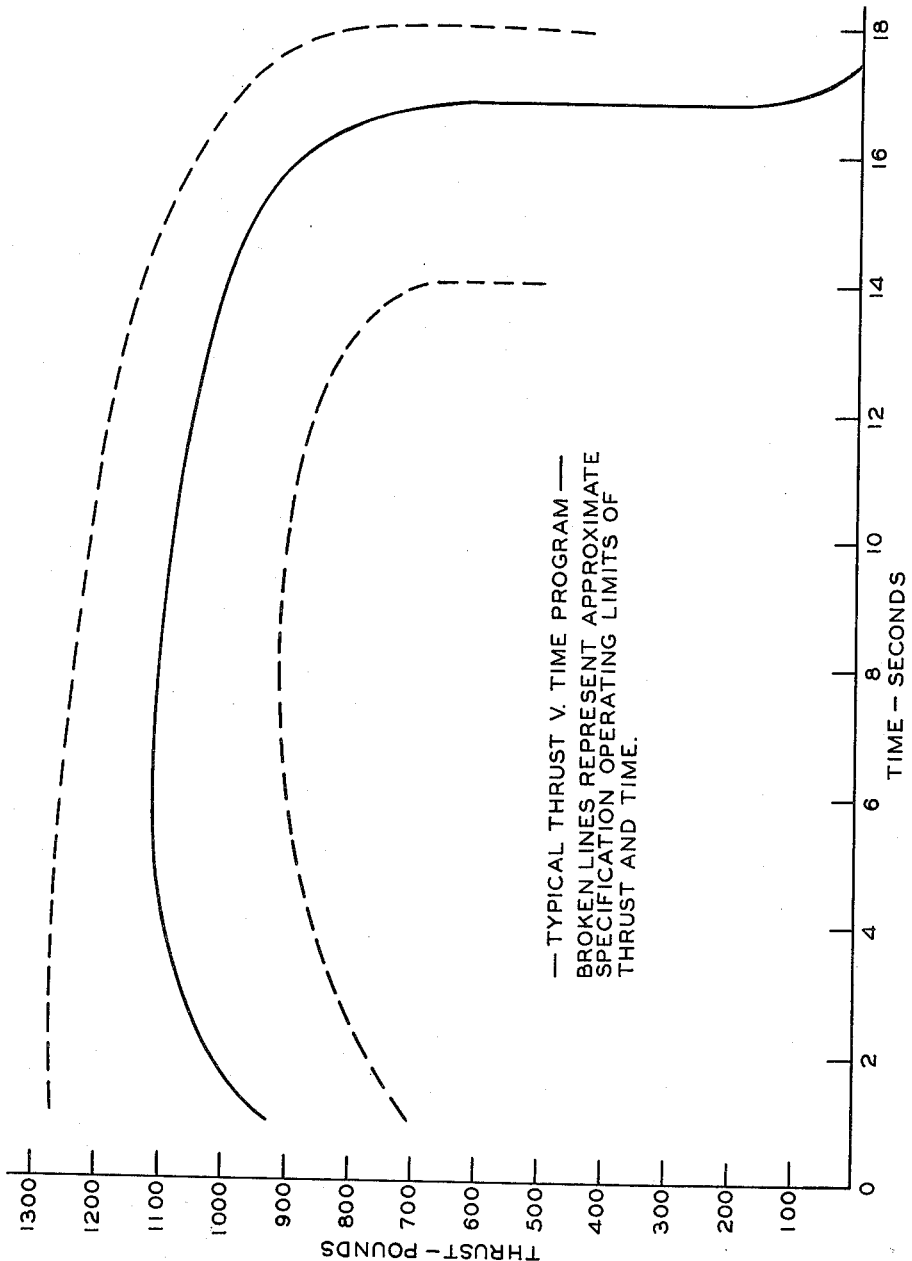
FIGURE 5 illustrates a typical thrust-versus-time program obtained in firing the propellant grains of the invention.

The solid line in FIGURE 5 represents a typical plot of the thrust-versus-time relationship or program when a rocket motor of the type illustrated in FIGURE 1 employing the improved propellant grain of the invention is fired. The broken lines in said FIGURE 5 represent approximate specification operating limits of thrust and time for JATO rocket motors of the type illustrated in FIGURE 1. Herein, reference has been made to a theoretical flat thrust-versus-time program. Although not shown in FIGURE 5, such a flat thrust-versus-time program can be represented by a straight line at the 1000 lb. thrust point.

FIGURES 6, 7 and 8 illustrate other arrangements of the bonding pad supporting means of the invention. In FIGURE 6 the bonding pads 23 are applied circumferentially to propellant grain 18. As shown in FIGURE 7 the bonding pads of FIGURE 6 are arranged in two groups of three, each equally spaced around the propellant grain. The position of the groups of said bonding pads with respect to the longitudinal dimension of the grain can be varied to suit the particular grain design. In FIGURE 8 only two bonding pads are shown on opposite sides of the propellant grain.

Other arrangements of said bonding pads can be employed. In arranging said bonding pads a port between the bonding pads such as at 25 in FIGURE 6 must be left for passage of gases along the outside of the grain when said grain is mounted in a case as in FIGURE 1.

Any suitable solid propellant material can be employed in fabricating the propellant grains of the invention.

Recently superior solid propellant materials have been discovered which comprise a solid oxidant, such as ammonium nitrate or ammonium perchlorate, and a rubbery material, such as a copolymer of butadiene and a vinyl pyridine or other substituted heterocyclic nitrogen base compound, which after incorporation is cured by a quaternization reaction or a vulcanization reaction. Solid propellant mixtures of this nature and a process for their production are disclosed and claimed in copending application Serial No. 284,447, filed April 25, 1952, by W. B. Reynolds and J. E. Prichard.

Propellant mixtures of this nature are a preferred class of propellant materials for use according to the invention. The following is one example of a suitable propellant material.

TABLE I

| Ingredients | phr. | Parts | Total Parts | Percent by Weight |
|---|---|---|---|---|
| Bd-MVP copolymer (90:10) 20 Mooney | 100 | | 11.093 | 10.88 |
| Furnace carbon black | 20 | | 2.218 | 2.17 |
| Dibutoxyethoxyethyl formal | 20 | | 2.218 | 2.17 |
| N,N-dimethyl-tert butylsulfenyl dithiocarbamate | 1 | 16.50 | 0.111 | 0.11 |
| Sulfur | 0.75 | | 0.083 | 0.08 |
| Zinc oxide | 3 | | 0.333 | 0.33 |
| Flexamine (Trademark)[1] | 3 | | 0.333 | 0.33 |
| Dioctyl ester of sodium sulfonsuccinic acid | 1 | | 0.111 | 0.11 |
| Ammonium nitrate | | 83.50 | 83.500 | 81.86 |
| Milori blue | | 2.00 | 2.000 | 1.96 |
| | | 102.00 | 102.000 | 100.00 |

[1] Physical mixture containing 65 percent of a complex diarylamine-ketone reaction product and 35 percent of N,N'-diphenyl-para-phenylene diamine.

The propellant composition disclosed and claimed in copending application, Serial No. 566,103, filed February 17, 1956, by J. M. Burton is a presently preferred propellant for use in the practice of the invention. The propellant composition given in Example I hereinafter is a typical example of this preferred propellant composition.

Any suitable igniter means can be employed in the rocket motor of the invention. The igniter assembly shown in FIGURE 1 comprises an igniter material 40 encased in a perforated container or wire basket 41 and an ignition sustaining material 42 capable of producing a relatively large volume of hot combustion gases, the sustaining material being disposed adjacent the igniter material, and means for igniting said igniter material. Said means for igniting the igniter material can comprise electric squibs 43, as shown, or any other suitable means such as an electric resistance wire embedded in the igniter material. Further details regarding said igniter assembly can be found in copending application Serial No. 591,340, filed June 14, 1956, by B. R. Adelman, now Patent No. 2,980,021, wherein said igniter assembly is disclosed and claimed. The igniter assembly disclosed and claimed in copending application Serial No. 605,904 filed August 23, 1956, by O. D. Ratliff, Jr., is also suitable for employ in the practice of the invention.

The bonding pads 23 employed for supporting and retaining the propellant grain in the rocket motor case can be formed of any suitable slowly combustible material. Sponge rubber is an example of such a material. Felt can also be employed. A presently preferred sponge rubber for use in the practice of the invention is one formed by means of a suitable blowing agent from a copolymer of a conjugated diene, such as 1,3-butadiene, and a vinyl substituted heterocyclic nitrogen base, such as 2-methyl-5-vinyl pyridine. Further details regarding said preferred sponge rubber can be found in copending application Serial No. 643,479, filed February 15, 1957, by M. H. Whitlock and R. L. Hall wherein said preferred sponge rubber is disclosed and claimed.

Said bonding pads are bonded to the propellant grain and the rocket motor by means of a rubber base cement. Any suitable cement can be employed. Examples of such cements are: Thiokol Bonding Agent sold by the Thiokol Corporation of 728 N. Clinton, Trenton, N.J.; Dutch Brand 7711 Rubber Cement, sold by Van Cleef Bros. Inc. of 7808 Woodlawn Avenue, Chicago 19, Illinois; and Van Cleef's Rubber Bonding Cement. One method for applying said bonding strips is disclosed and claimed in copending application Serial No. 566,507 filed February 20, 1956, by E. A. Westbrook and J. A. Sharp, now Patent No. 2,994,359.

The following examples will serve to further illustrate the invention.

*Example I*

A cylindrical JATO rocket motor grain was designed in accordance with the invention employing a solid propellant having the following composition.

| Ingredient: | Weight percent |
|---|---|
| Ammonium nitrate | 81.05 |
| Bd/MVP copolymer (90/10) | 11.00 |
| ZP–211 [2] | 2.21 |
| Milori blue | 1.94 |
| Philblack A [3] | 2.48 |
| Flexamine [4] | 0.33 |
| Magnesium oxide | 0.49 |
| Silicon dioxide | [1] 0.50 |

[1] The amount of silicon dioxide is adjusted to give the desired burning rate.
[2] Dibutoxyethoxyethyl formal.
[3] A furnace carbon black.
[4] See Table I.

| | |
|---|---|
| Length of grain | 25.6 inches. |
| Diameter of perforation | 1.875 inches. |
| Surface area of perforation | 151 square inches. |
| Outside diameter of grain | 9.375 inches. |
| Outside surface | 775 square inches. |
| Total burning surface S with no chamfering and with end surfaces restricted (as with end plates) | 906 square inches. |

In accordance with the invention it was desired to eliminate the end plates of the prior art, and it was desired to chamfer both ends of the grain.

| | Square inches |
|---|---|
| Thus, additional new burning surface $S_n$ introduced by removal of end plates and employing the desired amount of chamfering | 106 |
| Thus, total burning area | 1012 |

In accordance with the invention it was desired to use a grain support system consisting of 3 bonding pads spaced equally around the periphery of the grain between said grain and the motor case. Since the web thickness of the grain is 3.75 inches the minimum width W, and the minimum length L, of said pads are each 3.75 inches. Using a pad width of 4 inches it was desired to compensate for the additional burning surface introduced by the chamfering and elimination of the end plates to give a 16–NS–1000 JATO unit which would give an initial thrust not more than 10 percent below a normal flat thrust v. time program. Thus S ----------------------------------------- 906
$S_n$ ----------------------------------------- 106
W ----------------------------------------- 4
X ----------------------------------------- ¹3

¹ Number of bonding pads.

Then $L_t$, the theoretical length of pads needed to compensate completely for new surface $S_n$, would be $$L_t = \frac{S_n}{(W)(X)} = \frac{106}{12} = 8.8 \text{ inches}$$

$L_{t-10}$, the maximum length of pads to give an initial thrust not more than 10 percent less than normal is $$L_{t-10} = \frac{S_n + (S)(10\%)}{(W)(X)} = \frac{106 + 90.6}{12} = \frac{196.6}{12} = 16.4 \text{ inches}$$

A pad length sufficient to give a thrust v. time program about 7 percent less than theoretical was chosen for this specific JATO rocket.

$$L_{t-7} = \frac{(S_n + (S)(7\%)}{(W)(X)} = \frac{106 + 63.1}{12} = \frac{169.1}{12} = 14.1 \text{ inches}$$

A total of 50 propellant grains fabricated in accordance with Example I and mounted in a rocket motor like that illustrated in FIGURE 1 were fabricated and tested as given below in the following examples.

*Example II*

Three groups of six JATO units were fired. One group was fired at −75° F., the second group was fired at 60° F. and the third group was fired at 170° F. Before firing, each group was conditioned by maintaining same at its respective temperature for a period of 60 hours. The firings in all cases were entirely successful. The thrust-versus-time program illustrated in FIGURE 5 is a typical program from the firing from one of these units at 60° F.

*Example III*

A number of the remaining JATO rocket motors were divided into three groups of six each which were subjected to the following tests in sequence:

(1) A temperature cycling test consisting of shock cycling the assembled rocket motor through 2½ temperature cycles between the temperature extremes of 170° F. and −75° F.

(2) A vibration test wherein the rocket motors were subjected to a vibrational survey throughout the frequency range of 10 to 400 c.p.s. in both transverse and longitudinal attitudes and at temperatures of −75° F., 60° F., and 170° F.

(3) Each rocket of the sequence tests series was conditioned to its firing temperature following the vibration testing and dropped from a height of 4 ft. onto reinforced concrete on either the nozzle forward end, or the side opposite the mounting lugs. There was no evidence of significant damage in any of the dropping tests and there was no evidence of a loosening of the bonding pads. After the completion of said drop tests the three groups of rocket motors were conditioned as described above and fired at −75° F., 60° F., and 170° F. All of said firings were successful.

*Example IV*

The remaining rocket motors were divided into groups and put through various tests such as short time aging test, burst tests, etc. All of these tests were successful for the purposes intended.

While various examples have been given to illustrate the invention, said invention is not to be limited thereto. Various other modifications of the invention can be made or followed by those skilled in the art, in view of this disclosure, without departing from the spirit or scope of the invention

I claim:

1. A rocket motor comprising: a cylindrical case having one end closed and an exhaust nozzle positioned in the other end; an igniter extending into said case at said closed end; a cylindrical internal-external burning grain of solid propellant positioned within said case with its outer wall spaced apart a substantial distance from the inner wall of said case; and a plurality of resilient bonding and supporting pads spaced apart from each other around the periphery of said grain between said grain and said inner wall for bonding said grain to said inner wall and supporting said grain within said case, said pads each having a width at least equal to one web thickness of said grain and a length at least equal to one web thickness of said grain so as to bond and support said grain throughout the burning thereof, and said pads being the sole means of bonding and supporting said grain in said case.

2. A rocket motor comprising: a cylindrical case having one end closed and an exhaust nozzle axially positioned in the other end; an igniter positioned in said closed end and extending into said case; a cylindrical internal-external burning grain of solid propellant positioned in said case with its outer wall spaced apart a substantial distance from the inner wall of said case; and three resilient bonding and supporting pads disposed between and bonded to the outer wall of said grain and to the inner wall of said case for supporting said grain in said case, said pads being the sole means of bonding and supporting said grain in said case, said pads being spaced apart a distance of 120 degrees from each other with respect to the midpoints thereof, and each of said pads having a width at least equal to one web thickness of said grain and a length equal to at least one web thickness of said grain so as to bond and support said grain throughout the burning thereof.

3. A rocket motor comprising: a cylindrical case closed at its forward end and having an exhaust nozzle axially positioned in its after end; an axially positioned igniter extending into said case at said forward end; a cylindrical internal-external burning grain of solid propellant positioned in said case with its outer wall spaced apart a substantial distance from the inner wall of said case, said grain having a chamfer within the range of 5 to 29 degrees with respect to its outer wall formed on its forward end at the external edge thereof with the area of said forward end of said grain being from about 0.6 to 0.8 the cross-sectional area of said grain for facilitating simultaneous ignition of both the internal and external burning surfaces of said grain, said grain also having a chamfer within the range of 30 to 60 degrees with respect to its outer wall formed on said after end at the external edge thereof with the area of said after end of said grain being from about 0.7 to 0.9 the cross-sectional area of said grain for facilitating ignition of said after end of said grain; and a plurality of resilient bonding and supporting pads symmetrically spaced apart from eath other around the periphery of said grain between same and said inner wall for bonding said grain to said inner wall and supporting said grain within said case, said pads each having a width at least equal to one web thickness of said grain and a length at least equal to one web thickness of said grain so as to bond and support said grain throughout the burning thereof, and said pads being the sole means of bonding and supporting said grain in said case.

4. A rocket motor comprising: a cylindrical case having its forward end closed and an exhaust nozzle axially positioned in its after end; an igniter axially positioned in said forward end and extending into said case; a cylindrical internal-external burning grain of solid propellant disposed within said case with its outer wall spaced apart a substantial distance from the inner wall of said case, said grain having a chamfer within the range of 15 to 25 degrees with respect to its outer wall formed on its forward end at the external edge thereof with the area of said forward end of said grain being from 0.6 to 0.8 the cross-sectional area of said grain for facilitating simultaneous ignition of both the internal and external surfaces of said grain, and said grain also having a chamfer within the range of 30 to 60 degrees with respect to its outer wall formed on its after end at the external edge thereof with the area of said after end of said grain being from about 0.7 to 0.9 the cross-sectional area of said grain for facilitating ignition of said after end of said grain, and three resilient bonding and supporting pads disposed between and bonded to the outer wall of said grain and to the inner wall of said case as the sole means of bonding and supporting said grain in said case, said pads being spaced apart from each other a distance of 120 degrees with respect to the midpoints thereof, and each of said pads having a width at least equal to one web thickness of said grain and a length equal to at least one web thickness of said grain so as to bond and support said grain throughout the burning thereof.

References Cited in the file of this patent

UNITED STATES PATENTS

| | | |
|---|---|---|
| 199,723 | Laidley | Jan. 29, 1878 |
| 2,464,181 | Lauritsen | Mar. 8, 1949 |
| 2,515,048 | Lauritsen | July 11, 1950 |
| 2,755,620 | Gillot | July 24, 1956 |

FOREIGN PATENTS

| | | |
|---|---|---|
| 395,709 | France | Jan. 5, 1909 |
| 516,865 | Great Britain | Jan. 12, 1940 |
| 746,214 | Great Britain | Mar. 14, 1956 |
| 153,146 | Sweden | Jan. 17, 1956 |

OTHER REFERENCES

"A Quasi-Morphological Approach to the Geometry of Charges for Solid Propellant Rockets: The Family Tree of Charge Designs," by J. M. Vogel, published in "Jet Propulsion," vol. 26, No. 2, February 1956, pages 102–105.